United States Patent Office 3,718,153
Patented Feb. 27, 1973

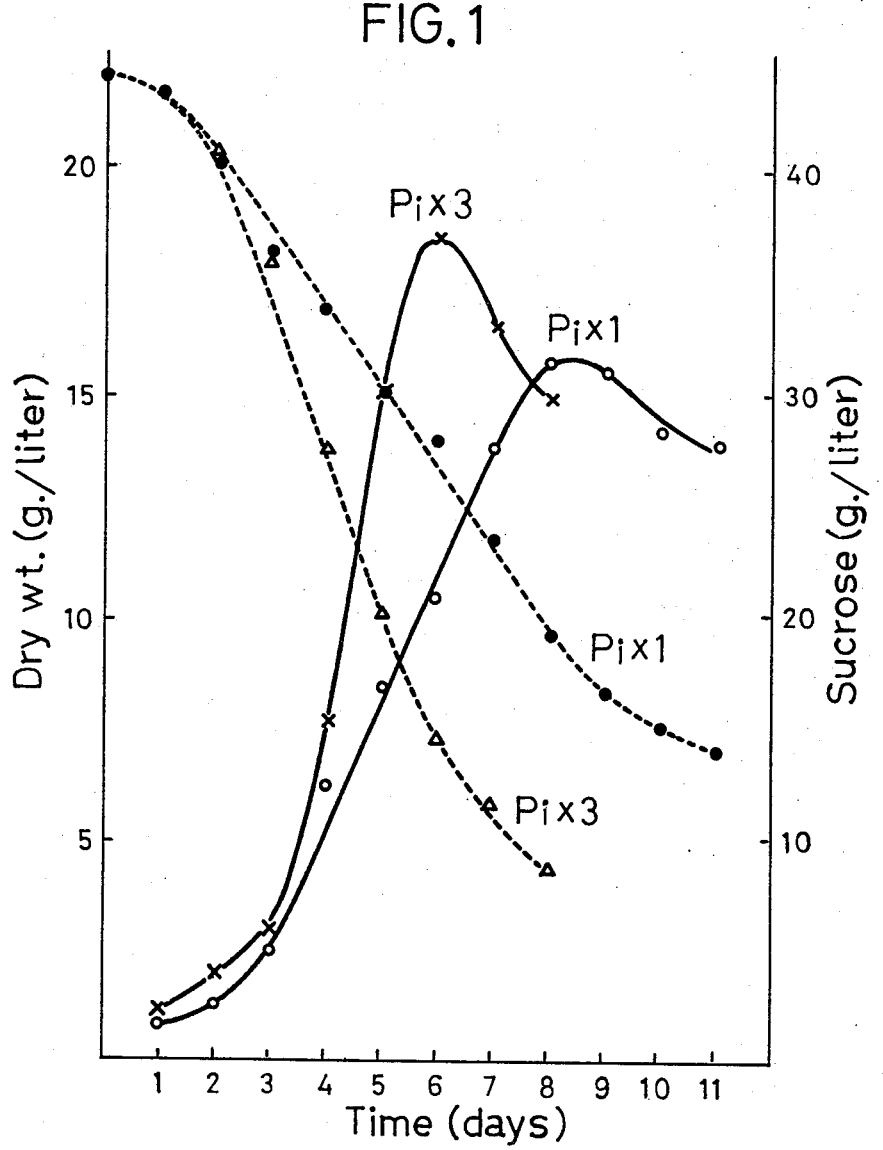

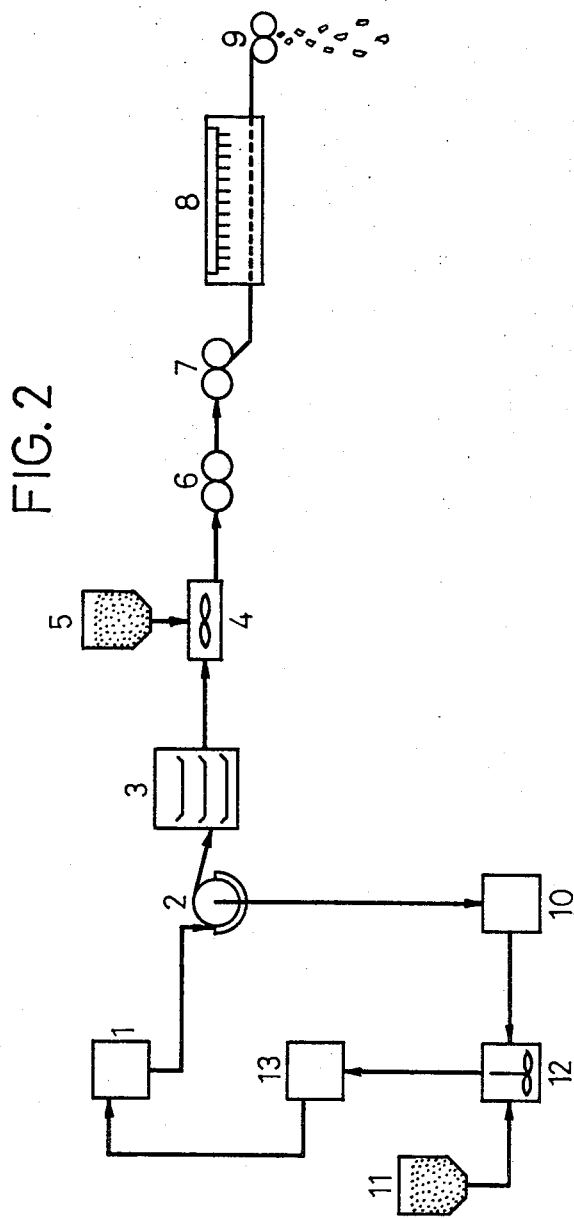

3,718,153
PROCESS FOR PREPARING SHEET-LIKE
MATERIAL FOR SMOKING
Masao Kobari, Tokyo, Hiroshi Hagiwara, Yokohama, and Kensuke Uchiyama, Tokyo, Japan, assignors to The Japan Monopoly Corporation, Tokyo, Japan
Filed Sept. 15, 1971, Ser. No. 180,652
Claims priority, application Japan, Sept. 28, 1970, 45/84,103; Nov. 4, 1970, 45/96,454
Int. Cl. A01g 31/00; A24b 3/14
U.S. Cl. 131—140 C
10 Claims

ABSTRACT OF THE DISCLOSURE

A process is disclosed for preparing sheet-like material for smoking which includes the steps of: culturing a fragment of a plant body of genus Nicotiana in a liquid medium under aerobic conditions to derive tobacco cells suspended in the liquid, isolating said tobacco cells from the cultured liquid, drying slightly the fresh tobacco cells at a temperature below 80° C. or mixing the fibrous materials and/or inorganic materials, so as to reduce the moisture content of the tobacco cells or the mixture thereof to 30–60%, forming the resulting moist powder into a sheet-like material and drying the same. The product has excellent physical properties and the cigarettes made therefrom have light and good organoleptic properties.

---

The present invention relates to a process for preparing sheet-like material for smoking using the tissue-culture of plants of the genus Nicotiana as raw materials.

The term "callus" in the present specification and claims refers to an amorphous lump of cells which have lost organ-forming capacity, which is formed when a fragment of the plant body is tissue-cultured on a solid medium, and which shows an external form resembling the agglutination tissue of the plant body. The term "tobacco cells" refers to a fine flocky dispersion of the cells formed when pieces of the callus are further inoculated and tissue-cultured in a liquid medium under aerobic conditions. A liquid containing tobacco cells is represented by the term "cell suspension" or "cultured broth."

Smoking tobacco has hitherto been produced by a process consisting of a long term cultivation step of a plant of genus Nicotiana on the field and a complex operation step for cigarette-making using the harvested leaf of said plant. However, said cultivation step of the plant is completely at the mercy of land- and climatic-conditions, and therefore the kind, quantity, quality, and the like of the tobacco leaf which is the main raw material of cigarettes have not necessarily been free from the influence of the above-mentioned natural conditions.

The plant body is generally composed of innumerable cells, which form the tissues and organs of the plant and perform living phenomena thereby. It was found lately that a complete plant body can be grown directly from any voluntarily taken-up cells of the plant body by so-called tissue-culturing of said cells, and such tissue-culture was applied in studies for the improvement of plant breeding by selecting cells having excellent plant genetic characteristics. Further it is known that so-called callus can be formed on a solid medium by means of such tissue-culture, while a suspension of fine cells of the plant can be obtained by tissue-culturing said callus in liquid medium under aerobic conditions.

We have investigated the above-mentioned tissue-culture of plants of genus Nicotiana, and found that the tobacco cells derived from the callus and propagated in cultured broth can be made readily into a sheet-like material for smoking.

An object of the invention is to provide a simple and facile process for preparing a sheet-like material for smoking.

Another object of the invention is to provide an industrial process for preparing a sheet-like material for smoking, which is not influenced by land- and soil-conditions or climatic conditions.

Still another object of the invention is to provide a process for preparing a sheet-like material for smoking containing little or no nicotine and having excellent physical and organoleptic properties.

Other objects of the invention will readily be understood from the following explanation.

Referring now to the drawings, FIG. 1 is a graph showing the increase of formed tobacco cells and the decrease of remaining sugar in the cultured broth, with the lapse of time, when the cells of Nicotiana tabacum var. bright yellow are tissue-cultured under aerobic conditions, using liquid media in which the content of $KH_2PO_4$ is varied, and FIG. 2 is a schematic flowsheet illustrating the process for preparing sheet-like materials for smoking from tobacco cells propagated in the cultured broth.

According to the present invention, the following plants of the various species belonging to genus Nicotiana may be used for tissue-culture:

cultural varieties such as N. tabacum var. bright yellow, N.t. var. xanthi ova, N.t. var. burley 21, N.t. var. enshu, N.t. var. matsukawa, N.t. var. nanbu, N.t. var. shirodaruma, N.t. var. suifu, N.t. var. xanthi yaka, N. velutina, N. rustica, and the like, and wild species such as N. glutinosa, N. acuminata, N. affinis, N. amplexaculis, N. arentsii, N. bigelovii, N. clevelandii, N. codifolia, N. debneyi, N. exclesior, N. fragrans, N. glauca, N. gossei, N. ingulba, N. knightiana, N. langsdorfii, N. miersii, N. repanda, N. multivalvis, N. occidentalis var. obliqua, N. rosulata, N. occidentalis var. occi, N. pauciflora, N. quadrivalvis, N. raimondii, N. simlans, N. solanifolia, N. stenocarpa, N. sylvestris, and the like.

These plants of genus Nicotiana have physiological properties more suitable for tissue-culture in comparison with other kinds of plant bodies, and many studies on tissue-culture using the plants of genus Nicotiana have hitherto been reported. Further, several suitable medium-compositions for tissue-culture have been mentioned in the literature, for example, so-called White's medium (1943), Heller's medium (1953), Murashige and Skoog's medium (1962) and Linsmaier and Skoog's medium (1965).

The said known media consist of inorganic substances and other minute elements which have hitherto been used in the medium for the water-culture method for plants such as, saccharides, auxins (growth-promoting substance), cytokinins, vitamins and amino acids. In particular the following substances are used in these media: inorganic salts such as potassium chloride, calcium chloride, potassium nitrate, calcium nitrate, sodium nitrate, ammonium nitrate, sodium sulfate, magnesium sulfate, potassium phosphate, sodium phosphate, ferric chloride, ferric sulfate, $Na_2$—EDTA ($Na_2$-Ethylenediamine tetraacetic acid), manganese sulfate, zinc sulfate, boric acid, potassium iodide, copper sulfate, sodium molybdate, aluminium chloride and cobalt chloride, saccharides such as sucrose, glucose, fructose and mannose, auxins such as 2,4-dichlorophenoxy-acetic acid, α-naphthaleneacetic acid and indol-3-acetic acid, cytokinins such as kinetin, vitamins such as thiamin hydrochloride, pyridoxin hydrochloride, nicotinic acid, myo-inositol and biotin, and amino acids such as glycin.

We have examined the compositions of said conventional media for tissue-culture and disclosed the following subjects:

(1) The yield of tobacco cells in the tissue-cultures using the known media was highest when the Linsmaier and Skoog's medium was adopted.

(2) It has a favourable effect on the yield of tobacco cells to use quantities of phosphate from twice to thrice as much as that of the Linsmaier and Skoog's medium which contains the largest quantity of phosphate among the said known media, i.e., 340–510 mg./liter, as shown in FIG. 1, where the solid-line designated with PiX3 is the curve indicating the dried weight of tobacco cells formed when a quantity of phosphate thrice as much as that of the medium was used, and the solid-line designated with PiX1 is the similar curve when a quantity of phosphate equal to that of the medium was used, while the dotted-lines with the same designations are the curves of remaining sugar in the cultured broth corresponding to said solid-lines, respectively.

(3) In the Linsmaier and Skoog's medium, myo-inositol can be replaced with thiamin hydrochloride.

From the above, an example of the suitable medium for tissue-culture used in the process of the invention is shown below:

TABLE 1

| | Mg./liter |
|---|---|
| $NH_4NO_3$ | 1,650 |
| $KNO_3$ | 1,900 |
| $CaCl_2 \cdot 2H_2O$ | 440 |
| $MgSO_4 \cdot 7H_2O$ | 370 |
| $KH_2PO_4$ | 340 |
| $Na_2$-EDTA | 37.3 |
| $FeSO_4 \cdot 7H_2O$ | 27.8 |
| $H_3BO_4$ | 6.2 |
| $MnSO_4 \cdot 4H_2O$ | 22.3 |
| $ZnSO_4 \cdot 4H_2O$ | 8.6 |
| KI | 0.83 |
| $Na_2MoO_4 \cdot 2H_2O$ | 0.25 |
| $CuSO_4 \cdot 5H_2O$ | 0.025 |
| $CoCl_2 \cdot 6H_2O$ | 0.025 |
| Sucrose | 40,000 |
| 2,4-dichlorophenoxy-acetic acid | 0.2 |
| Thiamin hydrochloride | 1.0 |
| Kinetin | 0.2 | pH (after sterilization) 5.0–6.2.

As regards the use of the tissue-culture from the plant body of the genus Nicotiana in the present invention, for example, fragments of the leaf, stem, root, flower, seed or other organs or tissues of the plant are washed, surface-sterilized, placed on a sterile agar medium for tissue-culture which has a composition as described in Table 1 and is contained in an Erlenmeyer's flask plugged with cotton wool, and are incubated at 25–35° C. Said fragments of organs or tissues swell and callus is derived in 4–5 weeks.

Such callus can be granudally made purer by means of repeating the above solid medium-culturing, that is by inoculating fresh solid medium in turn with small pieces of callus which are cut off from callus formed in the previous solid medium-culturing.

The callus thus reformed and refined on the solid medium is then inoculated into a liquid medium having the same composition as that of the solid medium but without agar, and cultured on a shaker at a temperature of 25–35° C. for 2–3 weeks. The inoculum is about 3 g. of callus by fresh weight to 100 ml. of liquid medium, and the callus propagates in the culture liquid as a flocky suspension, that is, as "tobacco cells." These tobacco cells become finer and are more rapidly formed when the above shake-culture in liquid medium is repeated, inoculating fresh liquid medium in turn with a portion of the previously cultured broth containing tobacco cells.

The cell suspension obtained in the shake-culture is, after being scaled-up by turns as described above, inoculated into a liquid medium of the same composition, set in a fermenter made of stainless steel, and cultured with aeration while being agitated gently. The inoculum is one tenth of the quantity of the whole medium, and intensive agitation is unfavourable as the membranes of the tobacco cells may be broken. The quantities of air required to aerate are about 0.5–2.0 liters/liter of medium/minute and the culturing period is within a week.

Tobacco cells, thus cultured and propagated in large quantity by the aeration culture with stirring, can be separated from the cultured broth by filtration or centrifugation, without the cell membranes being broken. The separated tobacco cell collection contains 90–95% (W.B.) of moisture, and the yield of dried weight of these tobacco cells is 50–65% of the sugar consumed in the cultured broth and amounts to 15–20 g. per liter of the medium. The single cell constituting these tobacco cells is an ellipsoid having a longer diameter of about 50–200μ and a shorter diameter of about 30–50μ.

In connection with the above explanation, it is observed that it takes at least 4–5 weeks of culture on agar medium, 2–3 weeks of liquid shake-culture and about a week of aeration-liquid culture with stirring, totalling to a long term of 7–9 weeks, to obtain tobacco cells as materials for smoking, and moreover such a total culture term is remarkably prolonged when both the solid medium- and liquid medium-culturings are repeated as described above. However, once a cultured broth where tobacco cells have been propagated in homogeneous suspension is obtained in the aeration-culture with stirring, additional cultured broth can be obtained within a short period by adopting a semi-continuous process, where a portion of the cultured broth is taken out to leave the other portion of said broth in the fermenter and fresh sterile medium is supplemented to the remaining broth so as to carry on the culturing of the tobacco cells again. For example, when about half of the volume of the cultured broth is taken out from the fermenter and aeration-culture is carried on after supplying the fermenter with fresh medium, subsequent logarithmic growth-phase of tobacco cells in the culturing will be approximately completed within a day or two, and consequently about a half of the approximately finished cultured broth can be obtained every day or every other day by employing the semi-continuous process. Furthermore, the cultured broth taken out from the fermenter as described above contains a relatively large quantity of remaining sugar, and consequently it is advantageous to return the filtrate of the taken-out cultured broth to the initial fermenter, after supplementing with fresh medium-constituents and sterilizing the same, so as to re-utilize the filtrate.

According to the present invention, the tobacco cells obtained by tissue-culture of plants of genus Nicotiana are made into a sheet-like material for smoking. There have hitherto been several methods for preparing the sheet-like materials for smoking, for example, extrusion, slurry, papermaking and microflaking. We have examined a process for preparing a sheet-like material using tobacco cells as a raw material, and as a result, we have found that the tobacco cells are used most suitably in the extrusion process in view of their viscidity. The sheet-like materials obtained in such a extrusion process using tobacco cells possess better physical and organoleptic properties than those obtained by the conventional extrusion process using no tobacco cells.

In the conventional extrusion process, 3–20% (based on the dried weight of the tobacco leaf substances mentioned hereinbelow) of a cellulose derivative such as methylcellulose, carboxymethylcellulose, or natural gums such as guar gum, gum arabic, as a binder, and 2–8% of dialdehyde starch, glyoxal, and the like, as a water-proofing agent, together with other supplementary agents and a small quantity of water, are added to tobacco powder, tobacco dust, vein (these will be called "tobacco leaf substances" for short hereafter in the specification), so as to form moist powder mixture containing 30–60% (W.B.) of moisture. The resulting mixture is cast into a sheet-like material by passing it through the extrusion roll and then drying. In other words, the addition of said binders and water-proofing agents have been indispensable in the conventional extrusion process to obtain sheet-like material provided with appropriate physical properties. However, the use of such extra additives has necessarily caused the lowering of the organoleptic properties of the final products therefrom, and further the physical properties of the sheet itself obtained through the conventional extrusion process have not always been satisfactory.

On the contrary, in the present invention, by utilizing the specific feature of viscidity of the fresh tobacco cells in the above extrusion-type process, sheet-like materials possessing excellent physical properties, particularly water-proofness, tensile strength and elongation, can be obtained without using any of the foregoing binders and water-proofing agents, and further, the cigarettes made of said sheet-like material have good organoleptic properties.

According to the present invention, fresh tobacco cells or the same mixed with tobacco leaf substances, and/or additives are used as the major raw materials. That is, in the invention, fresh tobacco cells separated from the cultured broth are dried slightly, or such fresh tobacco cells are mixed with tobacco leaf substances and/or the fibrous materials and/or inorganic materials which contain little moisture and do not damage the smoking characteristics of the final product therefrom, so as to form a moist powder having a moisture content of 30–60% (W.B.) and which is capable of being cast into sheet-like material by the extrusion rolls in the subsequent steps. Said slight drying is carried out at a temperature below 80° C. preferably below 60° C., under a reduced pressure, as the tobacco cells will shrink and harden if dried at about 80° C. When tobacco cells are mixed with tobacco leaf substances and/or additives, said tobacco cells act as a binder and water-proofing agent which are used in the conventional process. Both the operations of slightly drying the fresh tobacco cells and mixing the fresh tobacco cells with the tobacco leaf substances and/or the additives containing little water can be used together, if desired.

As said fibrous materials, vegetable fiber such as wood pulp, hemp, bagasse, beet, and inorganic fibers such as glass fiber, and carbon fiber, may be used. Silica, alumina, asbestos, kieselguhr, talc, calcium carbonate and zeolite may be used as said inorganic materials. These fibrous materials and inorganic materials serve to improve the strength and to increase the volume (fill) of the sheet-like material. The amount of the tobacco leaf substances to be added is below the value of ten-fold of the dried weight of the tobacco cells, and the amount of fibrous materials and/or inorganic materials to be added is below the value of the dried weight of the tobacco cells.

In the present invention, supplementary agents such as aromatics, burning agents, sweetenings, and hydroscopic agents may further be added to the above moist powder containing or consisting of the tobacco cells, in the same way as in the conventional process for preparing sheet-like material for smoking. However, the aromatics, sweetenings and hydroscopic agents among said supplementary agents may alternatively be incorporated into the finished (dried) sheet-like material of the invention. As the aromatics, essential oils such as cascarilla oil, bergamot oil, or iris oil, extracts such as benzoin tincture, tobacco extract, or fruit extract, and perfumeries such as coumarin, vanillin, or menthol, may be used. Activated carbon, sodium fumarate, potassium fumarate, and the like, may be used as burning agents, while sucrose, glycerol, propyleneglycol, and sorbitol may be used as sweetenings or hydroscopic agents. The quantities of these supplementary agents to be added are rather small, and therefore addition of these agents have little influence on the moisture content of the said moist powder.

The above described tobacco cells or mixture thereof, the moisture content of which has been adjusted to the prescribed value, can then be formed into the sheet-like material by means of passing through extrusion rolls. The sheet-like material thus obtained is dried to a moisture content of 10–14% (at a temperature of 20° C. and a humidity of 60%). The resulting sheet has excellent tensile strength and elongation, is waterproof and suffers very little loss due to breakdown in the subsequent cigarette-making treatments such as cutting, wrapping, casing, and the like.

Insofar as the reason or mechanism of the observed improvement in physical properties in the products according to the invention, it is considered that the pectin substance contained in the membranes of the tobacco cells exists in a so-called physiologically active state and acts as an excellent binder, and that said pectin substance combines with divalent cations such as calcium, magnesium, and the like, co-existing in said moistened powder, to become water-insoluble at the drying step of the sheets.

Tables 2 and 3 illustrate the comparisons of physical and organoleptic properties of sheet-like material, which is prepared by using only tobacco cells dried to the prescribed moisture content in the present invention, with those of sheet-like material prepared in the conventional extrusion process using no tobacco cells.

Each test item of the physical properties of sheet-like material shown in Table 2 was measured in the following way:

Thickness (mm.) was measured by a micrometer of the dial gauge type at a pressure of 550 g./cm.$^2$.

Strength (g./mm.$^2$) was calculated by the following equation which relates to above mentioned thickness (mm.), width (mm.) and tensile load (g.) of the test piece, the tensile load having been measured in such a way that a test piece with a width of 15 mm. and a length of 60–70 mm. had been tensed (loaded) by using a tensile tester with constant rate until said test piece was cut.

$$\text{Strength} = \frac{\text{Tensile load (g.)}}{\text{Width (15mm.)} \times \text{Thickness (mm.)}}$$

Elongation percent was expressed as a percentage of the elongation, which is measured in the same operation as in the abovementioned measuring of tensile load, based on the length of the test piece not loaded.

Filling value (g./cigarette) was calculated from stress which had been measured on a test sample shredded into a width of 0.8 mm. and put in a cylinder having a cross-sectional area of 40 cm.$^2$ and compressed at a rate of 0.6 mm./second.

The waterproof property (hours) was expressed as the time needed to break a test piece which was soaked in water at 25° C. in a dish and oscillated periodically until the test piece was broken.

The organoleptic properties shown in Table 3 were expressed by the number of persons who praised sample cigarettes in sensory tests (applying the pair test method). The test was performed by a panel consisting of ten professional persons who considered smell, taste, mildness and physiological lightness of sample cigarettes consisting of sheet-like materials prepared, respectively, by the present invention and the conventional extrusion process.

TABLE 2

| Major raw material | Present process, tobacco cells | Conventional process, tobacco powder |
|---|---|---|
| Additives: | | |
| Carboxymethyl cellulose, percent | | 5 |
| Glyoxal, percent | | 3 |
| Physical properties: | | |
| Thickness (mm.) | 0.16 | 0.17 |
| Strength (g./mm.$^2$) | 161 | 150 |
| Elongation (percent) | 2.9 | 1.0 |
| Filling value (g./cigarette) | 1.2 | 1.2 |
| Waterproof property (hours) | >48 | 0.5 |

TABLE 3

| | Major raw material | Flavour | Taste | Mildness | Physiological lightness |
|---|---|---|---|---|---|
| Present process | Tobacco cells | 4 | 5 | 10 | 10 |
| Conventional process | Tobacco powder | 6 | 5 | 0 | 0 |

The data in Table 2 show that the sheet-like material prepared according to the invention is excellent in strength, elongation and waterproof property, even though no carboxymethylcellulose had been added as binder and no glyoxal had been added as a waterproofing agent. Additionally, the data in Table 3 show that the cigarettes, which consist of the sheet-like material prepared according to the invention, are remarkably superior in mildness and physiological lightness, while being almost equivalent in flavour and taste to those obtained by the conventional process.

FIG. 2 is a schematic flowsheet illustrating an embodiment of the steps for preparing sheet-like material in the present invention, where a portion of cultured broth taken out from the fermenter 1 is filtered by the filter 2, and the separated tobacco cells are dried slightly at the dryer 3, and thereafter mixed at the mixer 4 with tobacco leaf substances and/or other additives and/or supplementary agents 5. The resulting moist powder mixture is formed into sheet-like material by being passed through the mixing rolls 6 and extruding rolls 7, and after being dried in the infrared dryer 8, the sheet-like material is cut by the cutter 9. The filtrate separated from the above tobacco cells is transitorily stored in the tank 10, mixed at the tank 12 with fresh medium-constituents 11, and returned to the initial fermenter 1 after being sterilized by the sterilizer 13.

The following examples serve to illustrate the invention without however limiting it:

EXAMPLE 1

A seed of *N. tabacum* var. bright yellow was washed with deionized water soaked in 95% ethanol for several seconds, further in 10% sodium hypochlorite solution for about 10 minutes and thereafter washed with sterile water. Said seed was placed on a sterilized solid culture-medium, which is prepared by adding 1% of agar to the composition shown in Table 1 and put in a cotton-plugged Erlenmeyer's flask, and incubated at a temperature of 26–30° C. for about 4 weeks. When a budding portion of the seed was brought in contact with the solid medium, a callus was derived from that contact point. This callus was cut off, transferred onto a fresh medium having the same composition as the above and cultured. After such a sub-culture of callus had been repeated thrice, about 3 g. of the callus by fresh weight formed in the last culturing were inoculated into 100 ml. of liquid medium of the same composition but without agar held in a 500 ml. Sakaguchi's flask, and cultured on a shaker at a temperature of 28–30° C. After about 2 weeks, tobacco cells were propagated in suspension in the liquid. About 10 ml. of this cultured broth were transferred into 100 ml. of fresh liquid medium of the same composition and shake-cultured again. After such a sub-culture had been repeated five times, the cultured broth, where tobacco cells were more finely and uniformly dispersed, was obtained in about a week.

About 100 ml. of said cultured broth were then inoculated into 1 liter of liquid medum of the same composition held in a 3-liter flask and shake-cultured for a week. The cultured broth obtained in the above 3-liter flask was inoculated into 11 liters of liquid medium held in 15-liter-jar-fermenter, and cultured at a temperature of 30° C., under an aeration rate of 7.5 liters/minute and an agitating rate of 50 r.p.m. After 5–6 days, about 5 liters, that is, about a half of the cultured broth in the jar-fermenter, where tobacco cells had been propagated in suspension, were taken out and centrifuged, and tobacco cells of 18 g. by dried weight per liter of the cultured broth were obtained. About 5.5 liters of fresh medium, which had been separately prepared and sterilized, were added to the fermenter and aeration-culture with agitating was carried on under the same conditions as described above except that the aeration rate was increased to 11.5 liters/minute. After two days about 5 liters of cultured broth were similarly taken out of the fermenter and fresh medium was added to the fermenter again. Thus, 13–15 g. by dried weight per liter of the cultured broth of tobacco cells were obtained every other day, by repeating the abovementioned semi-continuous culture of the tobacco cells.

2 kg. of tobacco cells by fresh weight (containing the dried weight of 140 g.) collected as described above were dried slightly at 60° C. in vacuo so as to reduce the moisture content thereof to about 35%. The moist powder obtained was mixed uniformly with 3 g. of sorbitol and a small quantity of cascarilla oil, and thereafter formed into a sheet-like material having a thickness of 0.1 mm. by being passed through a pair of extrusion rolls. The sheet was dried to a moisture content of about 12% using an infrared dryer.

Said sheet-like material had a strength of 161 g./mm.$^2$ and waterproof property of at least 48 hours, and the cigarettes made of this sheet were superior in mildness and physiological lightness.

EXAMPLE 2

Tobacco cells were propagated and collected by the similar operation to that in Example 1 except that a fragment of leaf of *N. tabacum* var. *xanthi* was used instead of a seed of *N.t.* var. bright yellow. 1.5 kg. of tobacco cells by fresh weight (containing the dried weight of 150 g.) were mixed uniformly with 1.4 kg. of dried tobacco dust, 2 g. of sugar and a small quantity of benzoin tincture so as to adjust the moisture content of the mixture to about 47% (W.B.). The resulting moist mixture was formed into a sheet-like material and dried in the same way as in Example 1.

Said sheet had a strength of 155 g./mm.$^2$ and a waterproof property of at least 24 hours, and the cigarettes made of this sheet were excellent in flavour and taste.

EXAMPLE 3

Tobacco cells were propagated and collected by an operation similar to that in Example 1 except that a fragment of root of *N. glutinosa* was used instead of a seed of *N.t.* var. bright yellow. The above tobacco cells whose moisture content was 95% (W.B.) were dried slightly at 80° C. by means of hot blast dehydration to reduce the moisture content to 45% (W.B.). 1 kg. of the above dried tobacco cells was mixed uniformly with 30 g. of asbestos, 3 g. of sorbitol and a small quantity of vanillin, and the resulting mixture which had a moisture content of about 44% (W.B.) was formed into a sheet-like material and dried in the same way as in Example 1.

The sheet had a strength of 160 g./mm.$^2$, a water-proof property of least 45 hours, and the cigarettes made therefrom were superior in mildness and physiological lightness.

EXAMPLE 4

Tobacco cells were propagated and collected in the same way as in Example 1 except that a fragment of the stem of *N. debneyi* was used instead of a seed of *N.t.* var. bright yellow. The above tobacco cells which had a moisture content of 95% (W.B.) were dried slightly at 80° C. by means of hot blast dehydration so as to reduce the moisture content to 40% (W.B.). 1 kg. of the above dried tobacco cells was mixed uniformly with 80 g. of wood pulp previously flavoured (N—BKP), and the resulting mixture which had a moisture content of about 37% (W.B.) was formed into a sheet-like material and dried in the same way as in Example 1. 4 g. of glycerin and a small quantity of cascarilla oil were sprinkled on the dried sheet.

The sheet-like material obtained had a strength of 205 g./mm.$^2$ and a water-proof property of at least 50 hours, and the cigarettes made therefrom were superior in mildness and physiological lightness.

EXAMPLE 5

Tobacco cells were propagated and collected in the same way as in Example 1 except that a fragment of a bud of *tabacum* var. *nambu* was used instead of a seed of *N.t.* var. bright yellow. 2 kg. of the tobacco cells which had a moisture content of 90% (W.B.) were mixed uniformly with 1 kg. of dried tobacco dust, 200 g. of kieselguhr, 3 g. of propyleneglycol and a small quantity of bergamot oil, and the resulting mixture which had a moisture content of about 56% (W.B.) was formed into a sheet-like material and dried in the same way as in Example 1.

The sheet had a strength of 158 g./mm.$^2$, a water-proof property of at least 28 hours, and the cigarettes made therefrom were superior in mildness and physiological lightness, while being excellent in flavour and taste.

EXAMPLE 6

Tobacco cells were propagated and collected in the same way as in Example 1 except that a fragment of petal of *N. tabacum* var. *enshu* was used instead of a seed of *N.t.* var. bright yellow and that the filtrate of the cultured broth taken from the jar-fermenter was re-used after being supplemented with fresh medium-constituents and sterilized instead of using the fresh medium which had been newly prepared and added to the jar-fermenter. The tobacco cells thus obtained were dried slightly at 80° C. by means of hot blast dehydration so as to reduce the moisture content thereof to 75% (W.B.) 1 kg. of the above dried tobacco cells was mixed uniformly with 300 g. of tobacco dust, 50 g. of wood pulp previously flavoured (N—BKP), 25 g. of bentonite, 3 g. of sorbitol and a small quantity of cascarilla oil, and the resulting mixture which had a moisture content of about 54% (W.B.) was formed into sheet-like materials and dried in the same way as in Example 1.

The sheet had a strength of 186 g./mm.$^2$, a water-proof property of at least 32 hours, and the cigarettes made therefrom were superior in mildness and physiological lightness, while being excellent in flavour and taste.

What we claim is:

1. A process for preparing sheet-like material for smoking, which comprises:
   (1) culturing a fragment of a plant body of the genus Nicotiana on a solid agar medium for plant tissue-culture and further comprising a mixture of growth-promoting agents selected from the group consisting of saccharides, inorganic salts, auxins, cytokinins and vitamins, to derive an amorphous lump of cells designated as callus on said solid medium,
   (2) inoculating said callus into a liquid medium of the same composition as described above, and culturing the same under aerobic conditions, so as to propagate it into a state of tobacco cells suspended in the liquid,
   (3) isolating said tobacco cells from the cultured liquid,
   (4) reducing the moisture content of the fresh isolated tobacco cells so as to produce a moist powder having a moisture content of 30–60%,
   (5) forming said moist powder into a sheet-like material and drying the same.

2. The process described in claim 1, where fresh tobacco cells isolated from the cultured liquid are dried slightly at a temperature below 80° C. to reduce the moisture content thereof to 30–60%.

3. The process described in claim 1, where fresh tobacco cells isolated from the cultured liquid are mixed with at least one member selected from the group consisting of tobacco leaf substances, fibrous materials, and inorganic materials, to reduce the moisture content of the resulting mixture thereof to 30–60%, said fibrous materials and inorganic materials not damaging the smoking characteristics of the final products.

4. The process described in claim 3, wherein the fibrous material is a fiber selected from the group consisting of wood pulp, hemp, bagasse, beet, and carbon fiber.

5. The process described in claim 3, wherein the inorganic material is silica, alumina, kieselguhr, zeolite, or calcium carbonate.

6. The process described in claim 1, wherein at least one supplementary agent selected from the group consisting of aromatics, burning agents, sweetenings or hydroscopic agents is mixed with the tobacco cells whose moisture content has been adjusted to 30–60%.

7. The process described in claim 1, wherein at least one member selected from the group consisting of aromatics, sweetenings and hydroscopic agents is sprinkled onto the dried sheet-like material.

8. The process described in claim 3, wherein the tobacco leaf substances are used in a quantity below the value of ten-fold of the dried weight of tobacco cells used.

9. The process described in claim 3, wherein at least one of the fibrous materials or inorganic materials is used in an amount below the value of the dried weight of the tobacco cells used.

10. The process described in claim 1, wherein the inorganic phosphate in the medium for plant tissue-culture is used in a quantity from twice to thrice as much as that in the conventional Linsmaier and Skoog's medium.

References Cited

UNITED STATES PATENTS

| | | | |
|---|---|---|---|
| 2,747,334 | 5/1956 | Routien et al. | 47—58 |
| 3,514,900 | 6/1970 | McDade | 47—58 |
| 3,628,287 | 12/1971 | Staba et al. | 47—58 |

ROBERT E. BAGWILL, Primary Examiner

U.S. Cl. X.R.

47—58